United States Patent [19]

Concordia et al.

[11] Patent Number: 4,683,122
[45] Date of Patent: Jul. 28, 1987

[54] GAS-LIQUID REACTOR AND METHOD FOR GAS-LIQUID MIXING

[75] Inventors: Joseph J. Concordia, Boston, Mass.; Donald R. Hall, Barrington, R.I.

[73] Assignee: Herzog-Hart Corporation, Boston, Mass.

[21] Appl. No.: 851,725

[22] Filed: Apr. 14, 1986

[51] Int. Cl.⁴ .............................................. B01F 3/04
[52] U.S. Cl. ................................ 422/227; 261/77; 261/DIG. 75; 422/231
[58] Field of Search ................... 261/77, DIG. 75; 422/230, 231, 227

[56] References Cited

U.S. PATENT DOCUMENTS

| | | | |
|---|---|---|---|
| 2,522,026 | 9/1950 | Evans | 261/77 |
| 3,823,172 | 7/1974 | Leuteritz | 260/409 |
| 3,838,002 | 9/1974 | Gluntz et al. | 261/77 |
| 3,910,826 | 10/1975 | Kataoka | 195/142 |
| 3,938,738 | 2/1976 | Nagel et al. | 261/77 |
| 4,037,825 | 7/1977 | Burgert | 259/4 R |
| 4,098,820 | 7/1978 | Couteau et al. | 261/DIG. 75 |
| 4,234,560 | 11/1980 | Kuerten et al. | 261/77 |
| 4,327,042 | 4/1982 | Hagino et al. | 261/77 |
| 4,455,156 | 6/1984 | Ramspeck et al. | 55/22 |

FOREIGN PATENT DOCUMENTS

| | | |
|---|---|---|
| 875013 | 7/1971 | Canada . |
| 958322 | 11/1974 | Canada ................. 261/DIG. 75 |
| 007489 | 2/1980 | European Pat. Off. . |
| 010571 | 5/1980 | European Pat. Off. . |
| 066822 | 12/1982 | European Pat. Off. . |
| 1442585 | 12/1968 | Fed. Rep. of Germany ........ 23/285 |
| 2129564 | 12/1972 | Fed. Rep. of Germany ... 261/DIG. 75 |
| 2322792 | 11/1974 | Fed. Rep. of Germany . |
| 2522324 | 2/1976 | Fed. Rep. of Germany ... 261/DIG. 75 |
| 2516284 | 10/1976 | Fed. Rep. of Germany . |
| 615630 | 1/1980 | Switzerland . |

OTHER PUBLICATIONS

Heinz Blenke, *Loop Reactors*, Springer-Verlag, 1979, pp. 122–137, Berlin, Heidelberg, N.Y., Cpr. 1979.
Karl Schugerl, "Neue Bioreaktoren fur Aerobe Prozesse," *Chem.-Ing.-Tech.*, 52 (1980), No. 12, pp. 951–965.
*Operation Units—Gas/Liquid Reactions Catalytic Hydrogenations, Nitrilations, Alkylation, etc.*, Buss/Herzog-Hart brochure, 1983.

*Primary Examiner*—Tim Miles
*Attorney, Agent, or Firm*—Wolf, Greenfield & Sacks

[57] ABSTRACT

A gas-liquid reactor includes a cylindrical vessel containing a liquid with a head space defined above the liquid surface, a submerged jet nozzle positioned on the vessel axis for injecting liquid and gas upwardly into the vessel, and at least two free jet nozzles positioned at the top of the vessel in the head space for injecting a liquid jet downwardly into the liquid in the vessel such that gas in the head space is entrained into the liquid jet and mixed into the liquid in the vessel. The reactor is provided with a cylindrical guide tube coaxial with the vessel sidewall and terminating below the liquid surface for directing circulation. A baffle system directs reactive gas rising from the liquid surface to the head space for entrainment in the liquid jet and directs reacted gas rising from the liquid surface to a vent. Diffuser tubes extend downwardly from each of the free jet nozzles into the liquid for delivering the gas-liquid mixture into the lower portion of the vessel outside the guide tube.

27 Claims, 3 Drawing Figures

GAS-LIQUID REACTOR AND METHOD FOR GAS-LIQUID MIXING

FIELD OF THE INVENTION

This invention relates to a reactor for transferring a reactive gas to a liquid and, more particularly, to a gas-liquid reactor having a high rate of gas transfer into the liquid and to a method for effectively transferring a reactive gas to a liquid.

BACKGROUND OF THE INVENTION

Apparatus for gas-liquid mixing is used for many chemical reaction processes and fermentation processes. A liquid to be reacted is placed in a reactor vessel. The liquid contains compounds to be reacted or cells which take part in a fermentation process. A gas is introduced into the liquid by a variety of techniques, and a reactive component of the gas reacts with the liquid in a desired manner.

One objective in the operation of gas-liquid reactors is a high rate of reaction in order to reduce processing times and costs. High reaction rates are obtained by increasing the interface area between the gas and the liquid which requires a large number of very small gas bubbles distributed through the liquid. It is well-known that a given volume of gas has maximum surface area when it is subdivided in a large number of small bubbles. In order to transfer large gas volumes to a liquid in the required form of evenly distributed small bubbles, energy must be applied to the liquid as a shear force. A large fraction of the energy used for stirring or agitation of the liquid by rotary mixers is not available as a shear force for gas-liquid mixing. In addition, small bubbles in the liquid have a tendency to coalesce into larger bubbles and rise to the surface, limiting the gas-liquid interface area and causing a pressure buildup in the head space at the top of the vessel.

A variety of techniques has been used for gas-liquid mixing including mechanically agitated tanks, sparged gas columns and nozzle assemblies to disperse gas in a liquid. One widely used gas-liquid reactor includes a submerged jet nozzle at the bottom of a cylindrical vessel, and a guide tube coaxial with the cylindrical vessel and positioned over the submerged jet nozzle. A gas-liquid mixture, injected by the nozzle, circulates upwardly through the guide tube to the surface of the liquid and then downwardly in the annular space outside the guide tube, resulting in continuous circulation. In another prior art gas-liquid reactor, a so-called free jet nozzle is positioned at the top of a vessel in the head space above the liquid surface. Reactive gas is introduced into the head space and is entrained by the downwardly injected liquid jet from the free jet nozzle.

All of the prior art gas-liquid reactors suffer from certain deficiencies and disadvantages. The gas introduced into the liquid tends to coalesce into larger bubbles and rise to the surface of the liquid, thereby reducing the interfacial surface area between the gas and the liquid. The unreacted gas in the head space must be vented to maintain system pressure and may be lost from the system. Usually the gas vented from the head space is only partially reacted and still contains useful reactive components. A variety of baffles, guides and tubes have been incorporated into reactor assemblies to extend the path length of the gas-liquid mixture and to provide more time for gas and liquid to be in intimate contact. However, none have been totally satisfactory. As a result, prior art reactors have been relatively inefficient in transferring gas to the liquid for reaction. Relatively large amounts of energy have been required to transfer limited amounts of gas to the liquid.

It is a general object of the present invention to provide a novel gas-liquid reactor.

It is another object of the present invention to provide a novel gas-liquid reactor with a high gas transfer rate.

It is a further object of the present invention to provide a novel gas-liquid reactor utilizing a submerged jet nozzle and at least two free jet nozzles to achieve a high rate of transfer of gas to the liquid.

It is a further object of the present invention to provide a novel gas-liquid reactor with relatively low energy requirements for transferring the gas to the liquid phase.

It is a further object of the present invention to provide a novel gas-liquid reactor wherein gas is efficiently transferred to the liquid phase.

It is a further object of the present invention to provide a method for effectively transferring a reactive gas to a liquid in a gas-liquid reactor.

SUMMARY OF THE INVENTION

According to the present invention, these and other objects and advantages are achieved in a gas-liquid reactor comprising a vessel for containing a liquid, the vessel having a sidewall, a top and a bottom, a submerged jet nozzle positioned at the bottom of the vessel for injecting a liquid and gas mixture upwardly into the liquid in the vessel and at least two free jet nozzles positioned at the top of the vessel in a head space above the liquid surface for injecting a liquid jet downwardly into the liquid in the vessel. Reactive gas in the head space is entrained into the liquid jet and mixed into the liquid in the vessel. The gas-liquid reactor further includes means for supplying reactive gas to the submerged jet nozzle, means for supplying liquid to the submerged jet nozzle and to the free jet nozzle, means for venting reacted gas from the vessel, and baffle means for directing reactive gas from the liquid to the head space for entrainment in the liquid jet from the free jet nozzle and for directing reacted gas to the venting means.

The vessel preferably comprises an upright cylinder closed at both ends and a cylindrical guide tube coaxial with the vessel. The submerged jet nozzle is positioned on the axis of the vessel and directs a gas-liquid mixture upwardly through the guide tube. The gas-liquid mixture then circulates downwardly through the annular region between the guide tube and the vessel wall.

The gas liquid reactor of the present invention is preferably provided with diffuser tubes extending from each free jet nozzle downwardly into the liquid in the vessel in the annular space between the guide tube and the vessel wall. The diffuser tubes cause the gas-liquid mixture generated by the free jet nozzle to be injected into the lower portion of the vessel. The diffuser tubes increase in diameter toward the bottom of the vessel to facilitate transfer of the gas-liquid mixture into the lower portion of the vessel.

The baffle means preferably includes a first horizontal baffle plate positioned in the head space above the liquid and a cylindrical baffle member extending downwardly from the first baffle plate into the liquid outside the guide tube. Gas rising from the liquid surface above the guide tube is directed into the head space for recirculation via the free jet nozzles while gas rising from the liquid in the annular space outside the guide tube is directed to the venting means.

According to another aspect of the present invention, there is provided a method for mixing a gas into a liquid in a gas-liquid reactor vessel. The method comprises the steps of injecting liquid and gas upwardly into the liquid in the vessel from a submerged jet nozzle positioned at the bottom of the vessel, injecting liquid and gas, which is entrained into the liquid from the head space in the vessel, downwardly into the liquid in the vessel from at least two free jet nozzles positioned in the head space, and directing reactive gas from the liquid to the head space for entrainment in the liquid jet from the free jet nozzle while directing reacted gas from the liquid to a vent.

BRIEF DESCRIPTION OF THE DRAWINGS

For a better understanding of the present invention together with other and further objects, advantages and capabilities thereof, reference may be had to the accompanying drawings which are incorporated herein by reference and in which.

DETAILED DESCRIPTION OF THE INVENTION

Figures 1, 1A, 2:
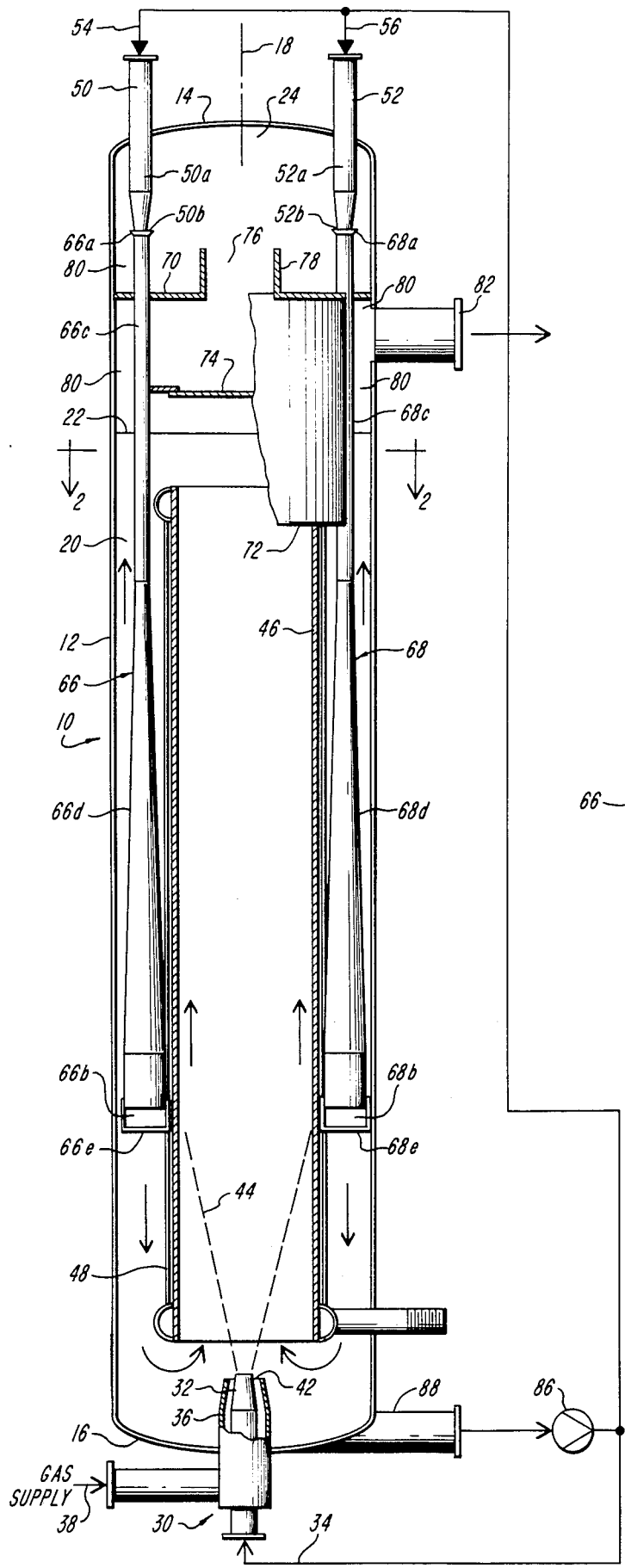
FIG. 1 is a cross-sectional elevation view of a gas-liquid reactor in accordance with the present invention with associated external elements shown schematically.
FIG. 1A is an enlarged partial cross-sectional view of a free jet nozzle and a diffuser tube.
FIG. 2 is a cross-sectional top view of the gas-liquid reactor shown in FIG. 1, taken through the line 2—2.

A gas-liquid reactor in accordance with the present invention is illustrated in FIGS. 1, 1A and 2. A vessel 10 includes a cylindrical sidewall 12, a top 14 and a bottom 16. The vessel 10 may be fabricated from any weldable metal such as plain or stainless steel and is positioned with the axis 18 of the cylindrical sidewall 12 oriented vertically. A liquid 20 to be reacted fills the major portion of the vessel 10. Above a liquid surface 22, the top 14 and the sidewall 12 define a head space 24 filled with a gas as described hereinafter.

A submerged jet nozzle 30 is mounted in the bottom 16 of the vessel 10 on the axis 18. The nozzle 30 includes an inner nozzle portion 32 which receives pressurized liquid through a conduit 34, and an outer nozzle portion 36 concentric with the inner nozzle portion 32 which receives a reactive gas through a conduit 38 from a gas supply 40. The inner and outer nozzle portions 32, 36 extend through the vessel bottom 16 and terminate within the liquid in vessel 10 in a nozzle tip 42.

Liquid is pumped from the inner nozzle portion 32 upwardly into the liquid in the vessel 10. Since the liquid entering the vessel 10 through the jet nozzle 30 has considerable velocity relative to the liquid in the vessel 10, there is created an interface 44 between the relatively fast-moving liquid from the nozzle 30 and the relatively slow-moving liquid in the vessel 10. The interface 44 is generally conical in shape, with the apex of the cone approximately coincident with the nozzle tip 42. The differential liquid velocities at the interface 44 create a shear force which, as noted hereinabove, is beneficial to transfer of gas to the liquid. The gas is introduced through the outer nozzle portion 36 to the tip 42 in a ring concentric with the inner nozzle portion 32, and is directed into the interface 44 to promote entrainment into the liquid.

A cylindrical guide tube 46 is positioned within the vessel 10 with its axis coincident with the axis 18. The guide tube 46 terminates below the liquid surface 22 and promotes circulation of the liquid gas mixture in the vessel 10 in a well-defined manner. The gas-liquid mixture injected by the submerged jet nozzle 30 passes upwardly through the guide tube 46, then radially outward near the liquid surface 22 and downwardly through the annular region between the guide tube 46 and the sidewall 12, as indicated by the arrows in FIG. 1. Preferably, the ratio between the diameter of the guide tube 46 and the diameter of the vessel 10 is in the range between 0.5 and 0.6.

In the example of FIG. 1, the guide tube 46 is provided with a heat transfer surface 48. A heat transfer liquid can be circulated from an external source through the passage between surface 48 and the guide tube 46 for heating or cooling of the liquid in vessel 10. The heat transfer surfaces can also be incorporated as part of the diffuser tubes, the vessel wall, or the external liquid recirculation pipes which transfer liquid from the vessel to the nozzles.

Mounted in the top 14 of the vessel 10 and symmetrically positioned with respect to the axis 18 are free jet nozzles 50, 52. The free jet nozzles 50, 52 include tubular portions 50a, 52a, which extend from outside the vessel 10 through the vessel top 14 into the head space 24 and terminate in tips 50b, 52b above the liquid surface 22. Liquid is received by the free jet nozzle 50 through a conduit 54 and is injected through the tip 50b downwardly into the liquid in the vessel 10. Similarly, liquid is received by the free jet nozzle 52 through a conduit 56 and is delivered through the tip 52b downwardly into the liquid in the vessel 10. The liquid injected under pressure from the jet nozzles 50, 52 forms liquid jets 60, 62 extending from the nozzle tips 50b, 52b, respectively, downwardly into the liquid in the vessel 10. The liquid jets 60, 62 are generally conical in shape and have turbulence and instability at their surfaces where the liquid interfaces with the gas in the head space 24. The turbulence creates shear force which causes gas in the head space 24 to be entrained into the liquid jets 60, 62 and carried downwardly into the liquid in the vessel 10.

The gas-liquid reactor in accordance with the present invention is further provided with diffusers 66, 68 for directing the liquid jets 60, 62, with gas entrained therein, to the lower portion of the vessel 10 for improved gas-liquid mixing. The diffusers 66, 68 are axially oriented with the nozzles 50, 52 and extend from flared ends 66a, 68a adjacent nozzle tips 50b, 52b downwardly into the liquid to outlet apertures 66b, 68b. Upper portions 66c, 68c of the diffusers are uniform diameter tubes while lower portions 66d, 68d are tapered to increase in diameter toward outlet apertures 66b, 68b. The flared ends 66a, 68a form a conical space for directing gas flow toward the liquid jets 60, 62. A low pressure region is created in upper portions 66c, 68c to promote entrainment of gas into the liquid jets 60, 62. When the liquid jets 60, 62 intersect the inner walls of the diffusers 66, 68, the jets attach to the walls and a strong shear plane develops which disperses the gas into small bubbles in the liquid. The tapered lower portions 66d, 68d decrease the velocity and increase the pressure of the gas-liquid mixture flowing downwardly, so that it can be discharged against the pressure existing in the lower portion of the vessel 10. Lower ends of the diffusers 66, 68 are covered by baffles 66c, 68c which direct the gas-liquid mixture outwardly through outlet apertures 66b, 68b.

The combination of free jet nozzles 50, 52 and diffusers 66, 68 is extremely efficient in mixing gas into the liquid since in the region of the liquid jets 60, 62, virtually all of the energy in the liquid jets 60, 62 goes into shear forces causing instabilities which scoop gas in and compress it, causing small bubbles to be entrained in the liquid jets 60, 62. As a result, gas is efficiently entrained and a high transfer rate is achieved.

While two free jet nozzles 50, 52 are included in the present example, it will be understood that additional free jet nozzles can be utilized. In each case, the free jet nozzles are equiangularly positioned about the vessel axis 18 at a radius greater than the radius of the guide tube 46. Also, while the present example describes a particular baffle 66e, 68e at the ends of the diffusers, it will be understood that the termination of the diffuser may have various configurations including, but not limited to, elbows as well as impingement baffles.

The gas-liquid reactor of the present invention is provided with a baffle system for separating reactive gases from reacted and substantially inert gases. The baffle system includes a horizontal baffle plate 70 across the vessel 10 above the liquid surface 22. A cylindrical baffle member 72 extends downwardly from the baffle plate 70 into the liquid outside the guide tube 46. The cylindrical baffle member 72 must provide sufficient clearance for liquid recirculation downwardly outside the guide tube 46. An optional third baffle plate 74 is positioned between the baffle plate 70 and the liquid surface 22 above the guide tube 46 and has a diameter slightly larger than the guide tube 46. The horizontal baffle plate 70 is provided with an aperture 76 within the periphery of the cylindrical baffle member 72 and a short pipe 78 extending upwardly from the aperture 76 into the head space 24. The pipe 78 acts as a guide for gas passing upwardly into the head space 24.

Gas, which circulates upwardly through the guide tube 46 and is partially reacted with the liquid therein, preferably recirculates through the annular region outside the guide tube 46. However, a fraction of the gas rises from liquid surface 22 and passes around the edge of the third baffle plate 74 and upwardly through the aperture 76 into the head space 24. The partially reacted gas is then entrained into the liquid jets 60, 62 as described above and is recirculated into the liquid through diffuser outlet apertures 66b, 68b for more efficient utilization of the reactive gas and a high gas transfer rate. A portion of the gas then passes upwardly through the annular region outside the baffle member 72 as indicated in FIG. 1 by arrows just below the baffle member 72, into an annular space 80 defined between the cylindrical baffle member 72 at the inside and the vessel sidewall 12 at the outside and between the baffle plate 70 at the top and the liquid surface 22 at the bottom. The gas reaching the annular space 80, to a great extent, has had the reactive species removed by reason of multiple passes through the liquid in the vessel 10. Gas reaching the annular space 80 passes out of the vessel 10 through a vent 82. Thus, the gas passing through the liquid surface 22 is separated into a partially reacted component which is directed into the head space 24 for entrainment into the liquid jets 60, 62, and a reacted component which is directed to the annular space 80 and vented from the vessel through the vent 82.

While the present example describes a particular baffle configuration 70, 72, 74, 78 to direct gas to the head space 24, it will be understood that other means for providing this flow path are available. Another means would be provided by a pipe connection. By using a pipe connection, the gas can be directed through various treatments, including among others, heat exchange, absorption of a gaseous component, drying, or gas enrichment.

An external pumping system includes a liquid pump 86, having its outlet coupled via the conduit 34 to the submerged jet nozzle 30, and via conduits 54, 56 to free jet nozzles 50, 52, respectively. A drain 88 from the vessel 10 is coupled via a conduit 90 to the inlet of the pump 86. As a result, liquid is continuously recirculated from the vessel 10 through the nozzles 30, 50 and 52. The external pumping system can be fitted with various other components (not shown) to further process the liquid; for example, a heat exchanger to adjust the liquid temperature, filters to collect solids which may be in the liquid, or special devices to remove and collect valuable products from the liquid.

Normally, the vessel 10 is filled with liquid to its prescribed capacity prior to operation of the above-described gas mixing system. In an alternative mode of operation, known as the "fed-batch" method of processing, the vessel is filled to about 35 percent of capacity. Then liquid is gradually added to the system from an external source through the submerged jet nozzles and the free jet nozzles so that gas mixing occurs as the vessel is filled.

An example will now be given of a gas-liquid reactor in accordance with the present invention with calculations of the various parameters and dimensions. The reactor of the present example is selected to have a volume of 100 liters and to be used for transfer of oxygen to the liquid. Initially, the dimensions of the vessel 10 are calculated in accordance with $$V = \pi/4 \cdot D^3 \cdot S \tag{1}$$

where
V = vessel volume
D = diameter of the cylindrical vessel
S = slenderness ratio of the vessel height to the vessel diameter = 5.

For a 100 liter vessel, D = 30 centimeters and H = 150 centimeters where H = vessel height.

Next, the dimensions of the guide tube 46 are calculated from $$D_E = 0.59 D \tag{2}$$
$$L_E = 7.5 D_E \tag{3}$$

where
$D_E$ = diameter of the guide tube 46
$L_E$ = length of the guide tube 46.

The constants in equations (2) and (3) are obtained with reference to Blenke, "Loop Reactors," Springer-Verlag, 1979, page 157. Equations (2) and (3) give $D_E$ = 17 centimeters and $L_E$ = 127.5 centimeters. $V_D$, the volume of the guide tube, is calculated at 28,925 cm³ and $V_A$, the annular volume outside the guide tube, is calculated at 71,075 cm³ using conventional geometric formulas.

The upper distance $A_O$ between the liquid surface and the top of guide tube 46 is calculated in accordance with $$X_O = 4D_E/D \cdot A_O/D \tag{4}$$

where $X_O$ is a clearance parameter. Substituting into equation (4) and using $X_O = 0.82$ (from the Blenke reference) gives $A_O = 11$ centimeters. A lower distance parameter $X_U$ is calculated in accordance with $$X_U = 4 D_E/D \cdot A_U/D \tag{5}$$

where $A_U = 11.5$ cm. Substituting into equation (5) gives $X_U = 0.86$ which is within acceptable limits.

Next, the flows through each of the nozzles 30, 50 and 52 are calculated. The total recirculation per hour, R, is selected to be 80 times the vessel volume V or 8,000 liters per hour. R can be given by $$R = R_{EX} + R_{INT} \tag{6}$$

where $R_{EX}$ = recirculation through the external loop to the nozzles 50, 52 and $R_{INT}$ = recirculation in the internal loop around the tube 46. The quantities $R_{EX}$ and $R_{INT}$ can be given by $$R_{EX} = F_{50} + F_{52} \text{ and} \tag{7}$$

$$R_{INT} = F_{30} + n_u F_{30} \tag{8}$$

where $F_{50}$ and $F_{52}$ are the liquid flows to the nozzles 50, 52 and $F_{30}$ is the liquid flow to the nozzle 30 and $n_u$ is a recirculation number. The recirculation number $n_u$ represents the ratio of the volume of liquid flowing in a loop around the guide tube 46 to the volume of liquid injected into the vessel 10 through the nozzle 30. Preferably, the recirculation number is in the range between 4 and 6. In the present example, $n_u$ is selected to be 5. Substituting this and the required recirculation rate of 8,000 liters per hour into the above equation and setting $F_{50} = F_{52}$, gives $$F_{50} + 3F_{30} = 4000 \tag{9}$$

A preferred solution to equation (9) establishes $F_{50} = F_{30} = F_{52} = 1000$ liters per hour or 4.46 gallons per minute.

The nozzle sizes are selected to give the desired flow rate and to provide a Reynolds number of at least 20,000. Using conventional techniques for calculation of nozzle flow rates and pressure preferred nozzle diameters of 0.2 inches to 0.3 inches are selected.

The liquid velocities in the various portions of the system are calculated from the flow rates and cross-sectional areas as follows:
Diffuser flow = 4.5 gallons per minute
Diffuser velocity = 2.3 feet per second
Guide tube flow = 27 gallons per minute
Guide tube velocity = 0.31 feet per second
Annulus flow = 31.5 gallons per minute
Annulus velocity = 0.12 feet per second
Now calculate the gas flows.

$$q = v(a_{GT} + a_A) \tag{10}$$

where
q = gas flow rate
v = gas velocity
$a_{GT}$ = area of the guide tube 46
$a_A$ = area of the annulus around the guide tube 46
The required vessel superficial gas velocity, v, is 0.197 feet/second. Equation (10) gives a flow rate, q, of 8.8 cubic feet per minute. The induced flow at nozzles 50 and 52 is given by $$q_{NA} = 2.4 \, q_{NL} \tag{11}$$

where $q_{NA}$ is the gas flow in cubic feet per second and $q_{NL}$ is the liquid flow in cubic feet per second. Substituting 4.5 gallons per minute into equation (10) gives $q_{NA} = 1.64$ CFM, and for two nozzles, $q_{NA} = 3.28$ CFM. This represents the volume of gas which can be entrained into the liquid jets 60, 62 from the nozzles 50 and 52.

Now the oxygen transfer rates can be estimated. From the above calculations, 8.8 CFM air will be injected through nozzle 30 and 3.28 CFM of air can be injected by means of nozzles 50, 52. It can be determined that the vent gas will be 0.542 pounds per minute of nitrogen gas and 0–0.165 pounds per minute of oxygen depending on the amount reacted. The oxygen transfer rate for nozzle 30 is given by $$M_O = k_1 a_1 (C_o - C_1) \tag{12}$$

where
$k_l$ = mass transfer coefficient
$a_1$ = gas/liquid interfacial area
$C_o$ = mean oxygen concentration at the inlet
$C_1$ = oxygen concentration in the liquid.
Substituting into equation (12) gives an oxygen mass flow rate of 2.00 pounds per hour for nozzle 30. The oxygen transfer rate $N_A$ for nozzles 50, 52 is given by $$N_A = K_L a (C_o 31 \, C_1) \tag{13}$$

where
$K_L a$ = mass transfer coefficient (see Kastanek, "International Chemical Engineering", Vol. 20, No. 1, 1980). Substituting into equation (13) gives $N_A$ equals 127.3 pounds per hour. Therefore, all oxygen present in the head space 24 will be recirculated into the liquid by the action of the nozzles 50, 52. The rating of the system is based on the total air flow to nozzle 30. For the above example, the oxygen transfer rate, OTR, in millimols per liter-hour equals 309. However, nozzle 30 can accept twice this air flow and nozzles 50, 52 will still have capacity to transfer all oxygen back into the liquid. Therefore, the range of operation for the above example is 309–620 millimols per liter-hour. The above example is summarized as follows:
Working volume: approximately 100 liters
External liquid recirculation: 13.5 gallons per minute
Internal gas recirculation: 3.3 SCFM
Gas feed rate: 8.8 SCFM
Vessel diameter: 30 centimeters
Guide tube diameter: 17 centimeters
Slenderness ratio: 5
Circulation number: 5
Oxygen transfer rate: 309–620 millimols per liter-hour.

While there has been shown and described what is at present considered the preferred embodiments of the invention, it will be obvious to those skilled in the art that various changes and modifications may be made therein without departing from the scope of the present invention as defined by the appended claims.

What is claimed is:

1. A gas-liquid reactor comprising:

a vessel for containing a liquid, said vessel having a sidewall, a top and a bottom, a head space being defined between the liquid surface and the top of said vessel;

a submerged jet nozzle positioned at the bottom of said vessel for injecting liquid and gas upwardly into the liquid in said vessel;

at least two free jet nozzles positioned at the top of said vessel in said head space for injecting a liquid jet downwardly into the liquid in said vessel such that gas in said head space is entrained into said liquid jet and mixed into the liquid in said vessel;

means for supplying reactive gas to said submerged jet nozzle;

means for supplying liquid to said submerged jet nozzle and said free jet nozzles;

means for venting reacted gas from said vessel; and baffle means for directing reactive gas rising from said liquid surface to said head space for entrainment in said liquid jet, and for directing reacted gas rising from said liquid surface to said venting means.

2. A gas-liquid reactor as defined in claim 1 wherein said vessel is a cylinder with closed ends and has a vertical axis, said submerged jet nozzle being positioned at the bottom of said vessel on said axis.

3. A gas-liquid reactor as defined in claim 2 further including a generally cylindrical guide tube, coaxial with said vessel sidewall and terminating below said liquid surface for promoting circulation upwardly through the guide tube and downwardly through the annular region outside the guide tube.

4. A gas-liquid reactor as defined in claim 3 including two free jet nozzles symmetrically positioned with respect to said axis at a distance therefrom greater than the radius of said guide tube such that a gas-liquid mixture is directed by said free jet nozzles into said liquid outside said guide tube.

5. A gas-liquid reactor as defined in claim 4 further including diffuser tubes extending downwardly from each of said free jet nozzles into said liquid for delivering the gas-liquid mixture formed by said free jet nozzles into the lower portion of said vessel outside said guide tube and for enhancing the entrainment of gas from the head space into said liquid jets.

6. A gas-liquid reactor as defined in claim 5 wherein each diffuser tube extends from a point adjacent the outlet of said free jet nozzle above said liquid surface to a region adjacent the lower end of said guide tube.

7. A gas-liquid reactor as defined in claim 5 wherein said diffuser tube includes an upper portion of uniform diameter and a lower tapered portion which increases in diameter toward the bottom of said vessel.

8. A gas-liquid reactor as defined in claim 5 wherein said diffuser tube includes a baffle at the lower end thereof and outlet apertures in the lower portion of the tube for directing the gas-liquid mixture radially outward with respect to the axis of said diffuser tube.

9. A gas-liquid reactor as defined in claim 3 wherein the ratio between the diameter of said guide tube and the diameter of said vessel is in the range between 0.5 and 0.6.

10. A gas-liquid reactor as defined in claim 5 wherein said baffle means comprises a first generally horizontal plate spaced above the surface of said liquid and a cylindrical baffle member extending downwardly from said plate into said liquid outside said guide tube, said horizontal plate having an aperture therethrough located inside the periphery of said downwardly extending cylinder.

11. A gas-liquid reactor as defined in claim 10 wherein said baffle means further includes a second horizontal plate positioned between said first horizontal plate and said liquid surface above said guide tube.

12. A gas-liquid reactor as defined in claim 10 wherein said venting means is coupled to an annular region defined between said first baffle plate and said liquid surface and between said vessel wall and said cylindrical baffle member.

13. A gas-liquid reactor as defined in claim 1 wherein said means for supplying liquid includes pump means for recirculating liquid from said vessel to said submerged jet nozzle and to said free jet nozzles.

14. A gas-liquid reactor as defined in claim 13 wherein the ratio of the liquid volume circulating in said vessel around said guide tube to the liquid volume supplied to said submerged jet nozzle is in the range between 4 and 6.

15. A gas-liquid reactor as defined in claim 10, wherein said baffle means further includes a conduit extending upwardly from said aperture into said head space for dispersal of reactive gases therein.

16. A method for mixing gas into a liquid in a gas-liquid reactor of the type including a vessel for containing the liquid, the vessel having a cylindrical sidewall, a top and a bottom and a head space defined between the liquid surface and the vessel, said method comprising the steps of:

injecting liquid and gas into the liquid in said vessel through a submerged jet nozzle;

injecting a liquid jet into the lower portion of the liquid in said vessel from a plurality of free jet nozzle means positioned in said vessel in said head space such that gas in said head space is entrained into said liquid jet and mixed into the liquid in said vessel; and directing reactive gas from said liquid surface to said head space for entrainment in said liquid jet from said free jet nozzle means and for directing reacted gas from said liquid surface out of said vessel.

17. A method for mixing gas into a liquid as defined in claim 16 wherein said step of injecting liquid and gas into the liquid through a submerged jet nozzle includes the step of injecting liquid and gas upwardly into the liquid through the submerged jet nozzle centrally positioned at the bottom of said vessel.

18. A method for mixing gas into a liquid as defined in claim 17 further including the step of controlling the circulation of liquid and gas in said vessel with a cylindrical guide tube coaxial with said cylindrical sidewall.

19. A method for mixing gas into a liquid as defined in claim 18 wherein said step of injecting a liquid jet into the liquid in said vessel from free jet nozzle means includes injecting the liquid jet downwardly into the liquid outside said guide tube from equally-spaced free jet nozzles.

20. A method for mixing gas into a liquid as defined in claim 19 wherein the step of injecting a liquid jet downwardly into the liquid in said vessel includes delivering the liquid jet with gas entrained therein into the lower portion of the liquid in said vessel.

21. A method for mixing gas into a liquid as defined in claim 20 further including the step of gradually filling said vessel from about 35 percent of vessel capacity to full capacity from an external source during mixing of gas into the liquid.

22. A gas-liquid reactor comprising:
   a vessel for containing a liquid, said vessel having a sidewall, a top and a bottom, a head space being defined between the liquid surface and said vessel;
   a submerged jet nozzle positioned at the bottom of said vessel for injecting liquid and gas into the liquid in said vessel;
   free jet nozzle means positioned in said head space for injecting a liquid jet into the liquid in said vessel such that gas in said head space is entrained into said liquid jet and mixed into the liquid in said vessel;
   diffuser tubes extending from said free jet nozzle means into said liquid for delivering the gas-liquid mixture formed by said free jet nozzle means into the lower portion of said vessel;
   means for supplying reactive gas to said submerged jet nozzle;
   means for supplying liquid to said submerged jet nozzle and said free jet nozzle means; and
   means for venting gas from said head space.

23. A gas-liquid reactor as defined in claim 22 wherein said submerged jet nozzle is centrally located in said vessel and injects liquid and gas upwardly into the liquid in said vessel.

24. A gas-liquid reaqtor as defined in claim 23 further including a guide tube coaxial with the sidewall of said vessel for controlling circulation of liquid and gas in said vessel.

25. A gas-liquid reactor as defined in claim 24 wherein said free jet nozzle means includes equally-spaced free jet nozzles positioned at the top of said vessel for injecting the liquid jet and gas entrained therein downwardly into the liquid in the vessel outside said guide tube.

26. A gas-liquid reactor as defined in claim 25 further including heat transfer means for transferring thermal energy to or from said liquid.

27. A gas-liquid reactor comprising:
   a vessel for containing a liquid, said vessel having a cylindrical sidewall, a top and a bottom, a head space being defined between the liquid surface and the top of said vessel;
   a submerged jet nozzle positioned at the bottom of said vessel for injecting liquid and gas upwardly into the liquid in said vessel;
   a generally cylindrical guide tube coaxial with said vessel sidewall and terminating below the surface of said liquid;
   at least two free jet nozzles positioned at the top of said vessel in said head space for injecting a liquid jet downwardly into the liquid in said vessel such that gas in said head space is entrained into said liquid jet and mixed into the liquid in said vessel;
   diffuser tubes extending downwardly from each of said free jet nozzles into said liquid for delivering the gas-liquid mixture formed by said free jet nozzles into the lower portion of said vessel;
   means for supplying reactive gas to said submerged jet nozzle;
   means for supplying liquid to said submerged jet nozzle and said free jet nozzles;
   means for venting reacted gas from said vessel; and
   baffle means for directing reactive gas rising from said liquid surface to said head space for entrainment in said liquid jet and for directing reacted gas rising from said liquid surface to said venting means.

* * * * *